United States Patent [19]

Feil

[11] E Re. 31,144

[45] Reissued Feb. 8, 1983

[54] MULTI-STATION TELEPHONE SWITCHING SYSTEM

[75] Inventor: Thomas E. Feil, New York, N.Y.

[73] Assignee: Interconnect Planning Corporation, New York, N.Y.

[21] Appl. No.: 263,208

[22] Filed: May 13, 1981

Related U.S. Patent Documents

Reissue of:

[64] Patent No.: 3,991,282
Issued: Nov. 9, 1976
Appl. No.: 536,838
Filed: Dec. 27, 1974

[51] Int. Cl.[3] ..... H04M 1/72
[52] U.S. Cl. ..... 179/99 LS; 179/99 A
[58] Field of Search ..... 179/5.5, 27 CA, 27 FC, 179/84 L, 99 A, 99 H, 99 LS

[56] References Cited

U.S. PATENT DOCUMENTS

| | | | |
|---|---|---|---|
| 2,993,095 | 7/1961 | Arnold et al. | 179/91 R |
| 3,150,238 | 9/1964 | Carter | 179/99 R |
| 3,530,254 | 9/1970 | Berryman et al. | 179/27 CA |
| 3,686,440 | 8/1972 | Kroeger | 179/5.5 |
| 3,727,003 | 4/1973 | Paraskevakos | 178/28 |
| 3,733,442 | 5/1973 | Lee | 179/99 R |
| 3,757,056 | 9/1973 | Foulkes | 179/99 R |
| 3,819,871 | 6/1974 | Verdon | 179/99 R |
| 3,906,168 | 9/1975 | McEowen | 179/84 L |
| 3,928,732 | 12/1975 | Simon et al. | 179/99 R |
| 3,931,481 | 1/1976 | Jackson | 179/99 R |

OTHER PUBLICATIONS

"Crystal Lamps are Lighting up the Bell System", Bell Labs Record; Nov. 1972; p. 331.

"The Tn Broker System"; Nachr. Telef. & Normalzeit (Germany); 1972, No. 73; pp. 20–22.

M. Ozenberger; "Voice Communication System for Air Traffic Control"; Bell Labs Record; May 1961; pp. 154–160.

W. Keith, "A New Switching System for Right-of--Way Companies"; Bell Labs Record; Apr. 1968; pp. 117–120.

*Primary Examiner*—G. Z. Rubinson
*Assistant Examiner*—Randall P. Myers
*Attorney, Agent, or Firm*—Morgan, Finnegan, Pine, Foley & Lee

[57] ABSTRACT

A multi-station telephone communication system in which there is designated a master station and several other stations. Each of the stations is capable of communicating with any of a large number of standard telephone lines and non-locking pushbuttons are utilized to select the lines connected to each station. Each station is capable of monitoring the active line on which any of the other stations is communicating. Additionally, the master station is capable of supervising the conversation in any of the other stations by an ASSIST LOOP connection, in which the master station can overhear the conversation, but communicate one way with only one of the parties in the two-way communication. Each station is provided with a turret having panels in which are mounted their respective displays for indicating the active lines which are in communication with the respective turret as well as the lines in active communication with the other stations.

9 Claims, 5 Drawing Figures

MULTI-STATION TELEPHONE SWITCHING SYSTEM

Matter enclosed in heavy brackets [ ] appears in the original patent but forms no part of this reissue specification; matter printed in italics indicates the additions made by reissue.

BACKGROUND OF THE INVENTION

This invention relates to a telephone communication system, and more particularly to a multi-station communication system.

Conventionally, multi-line, multi-station telephone communication systems include complex and cumbersome mechanically interconnected pushbutton locking means. When any station wants to communicate over any line, a mechanical pushbutton is depressed at that station corresponding to the line, and if other lines have been depressed, they are released. When the number of pushbuttons reaches an excess of ten, the mechanical interconnections become quite unwieldy, cumbersome and complex, necessitating complex and expensive equipment which is often faulty.

In certain environments, there are a plurality of stations which are actively communicating over a large number of telephone lines, and it is important that each station have some idea as to which lines the other stations are actively talking on. Further, it often occurs that a master station may be required to supervise the conversation at other stations, the master station listening in to the conversations at the other stations.

An object of this invention is to provide an improved multistation multi-line telephone communication system.

Another object of this invention is to provide such a system in which mechanical interlocks are eliminated and electronic non-locking pushbutton means are employed for the various lines connected with the various stations.

Yet another object of this invention is to provide such a multi-station communication system which is reliable, efficient and reasonably inexpensive as compared with prior art devices.

Another object of this invention is to provide a multi-station system in which each station is capable of monitoring the active lines for the other stations.

Yet another object of this invention is to provide such a multi-station system in which there is a master station capable of supervising conversations at any of the other stations, and directly communicating with said one station without communicating with the other party of the communication with which said station in engaged.

Another object of this invention is to provide a multi-station telephone switching system in which turret means are employed at each of the said stations, said turret means employing both non-locking pushbutton switch means and a display means for indicating the active line with which said station is communicating.

Another object of this invention is to provide such a turret system in which an easily discernible display is provided indicating the active lines in communication with the respective stations.

Other objects, advantages and features of this invention will become more apparent from the following description.

DETAILED DESCRIPTION

The term telephone line or standard telephone line as used in this Specification and Claims is meant to designate standard Bell System or other telephone system lines over which two-party communication takes place. These telephone lines ae meant to distinguish from local intra-network intercom type lines found within a location or installation. Thus, when the Specification and Claims refer to a telephone station communicating over a standard telephone line, in the conventional sense, that telephone station will be communicating with some remotely located telephone station over standard Bell System or other system telephone lines.

Figure 1:
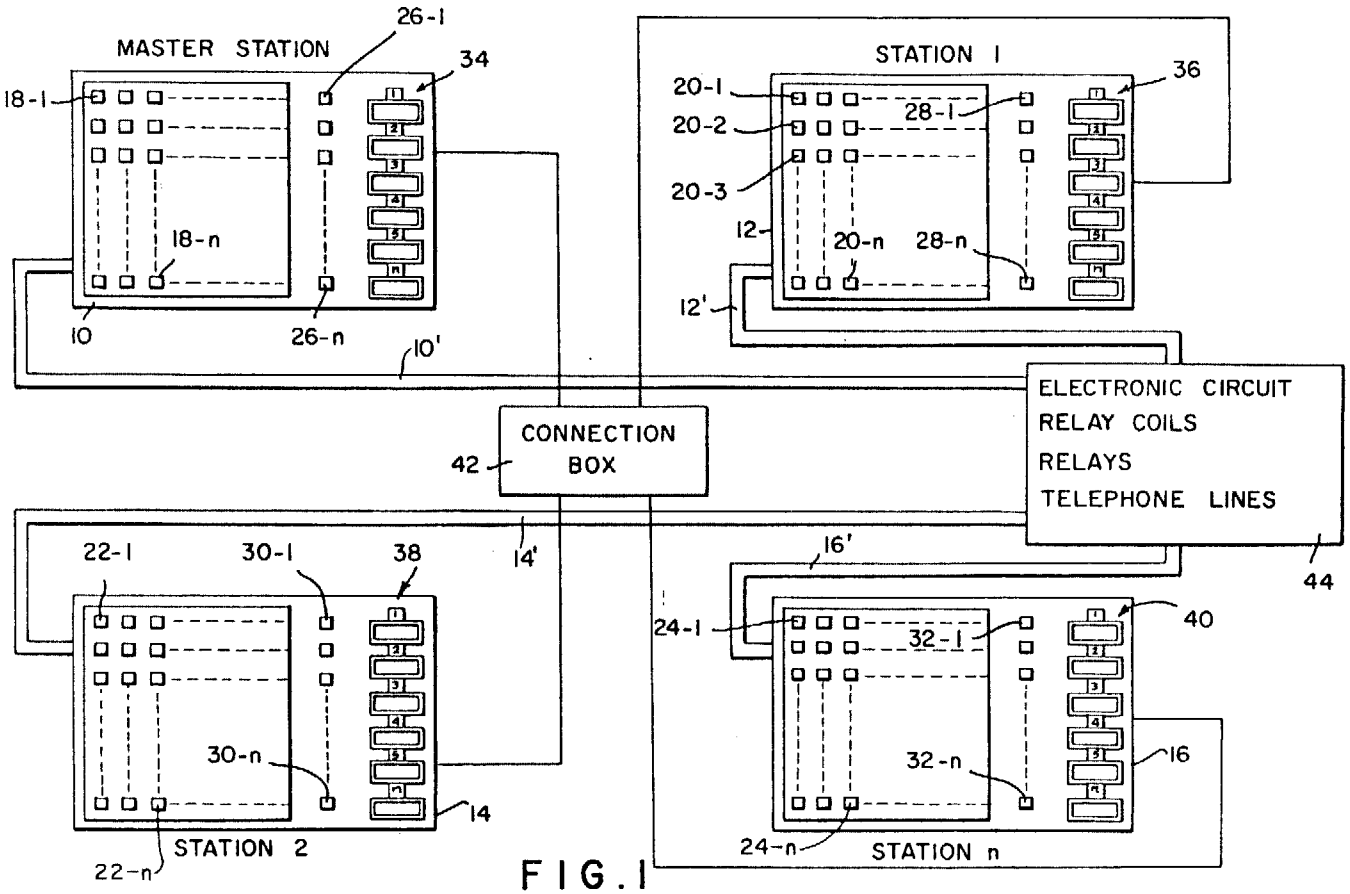
FIG. 1 is a block diagram representative of a multi-station system employing the principles of this invention.

Referring to the drawings, and in particular to FIG. 1, there is shown a block diagram illustrating the multi-station telephone communication system of this invention. In particular, there is shown at numeral 10, a master station; 12 station 1; 14, station 2; and 16, station n. Each station is provided with a plurality of non-locking pushbuttons within a telephone line panel area, the non-locking pushbuttons corresponding to specific telephone lines available for active communication with each station. For purposes of clarity, the master station is shown having pushbuttons 18-1 through 18-n, with the pushbuttons at station 1 being designated as 20-1 through 20-n, the pushbuttons at station 2 being designated as 22-1 through 22-n, and the pushbuttons at station n being designated as 24-1 through 24-n. The non-locking pushbuttons corresponding to the telephone lines are arranged in rows and columns over the larger portion of the turret display. Additionally, set of non-locking functional pushbuttons are located in a panel area along the last column of the turret face and are designated 26-1 through 26-n for the master station, 28-1 through 28-n for the station 1, 30-1 through 30-n for the station 2, and 32-1 through 32-n for station n correspond to functional pushbuttons, the functions of which will be discussed hereinafter. The panel areas are formed in the same plane.

Each panel at each station is also provided with a panel area or section in which each station is permanently displayed by a corresponding numeral as seen in areas 34, 38 and 40 of the master station, station 1, station 2, and station n, respectively. Thus, the window designated as 1 on area 34 of the master station would carry a visual display of the line on which station 1 is communicating, while station 1 would carry the same number within its corresponding window designated 1. In station 1, the line with which station 2 is communicating would be carried on the area designated as 2 as would each of the windows corresponding to station 2. Each of the stations is connected through a conveniently designated connection box 42 to the other stations for the purposes of carrying information corresponding to the active lines and other functional information, to be described hereinafter. Each station is also connected by way of a cable 10', 12', 14' and 16' to a remotely located electronic control circuit in which there is located an electronic circuit, relay coils, corresponding relays and telephone lines, the details of which will be explained hereinafter.

Each of the stations comprises turrets upon which there is mounted a panel, in which panel there is located the non-locking pushbutton switch means corresponding to each possible line connectible to each station, additional non-locking pushbutton means corresponding to specific functions and window areas corresponding to the stations connected within the network.

When the operator at station 1 wants to connect with a telephone line, he merely scans the turret to see which of the lines is presently active and then chooses another line. Upon depression of a non-locking pushbutton, the corresponding pushbutton at all stations will be lit as is conventional and the line corresponding to that button will be displayed in the station 1 panel area, so that the operator at station 1 will know which line he is on as well as all other stations. Sometimes it is of value that more than one station can be connected to this same line, and during this situation, any of the other operators at a station can determine the line to which any other specific station is connected by merely scanning its turret.

Due to the electronic switching system pushbutton means employed in each turret, the complex mechanical interconnections previously found are eliminated. In the present situation, up to sixty lines can be accommodated per station, although additional lines also can be accommodated as required. The cables connecting each station and the remote electronics 44 merely carry electrical signals to control the remote signalling and switching, so as to allow each of the stations to be connected to selected ones of the plurality of telephone lines available for each station.

Figures 2, 3:
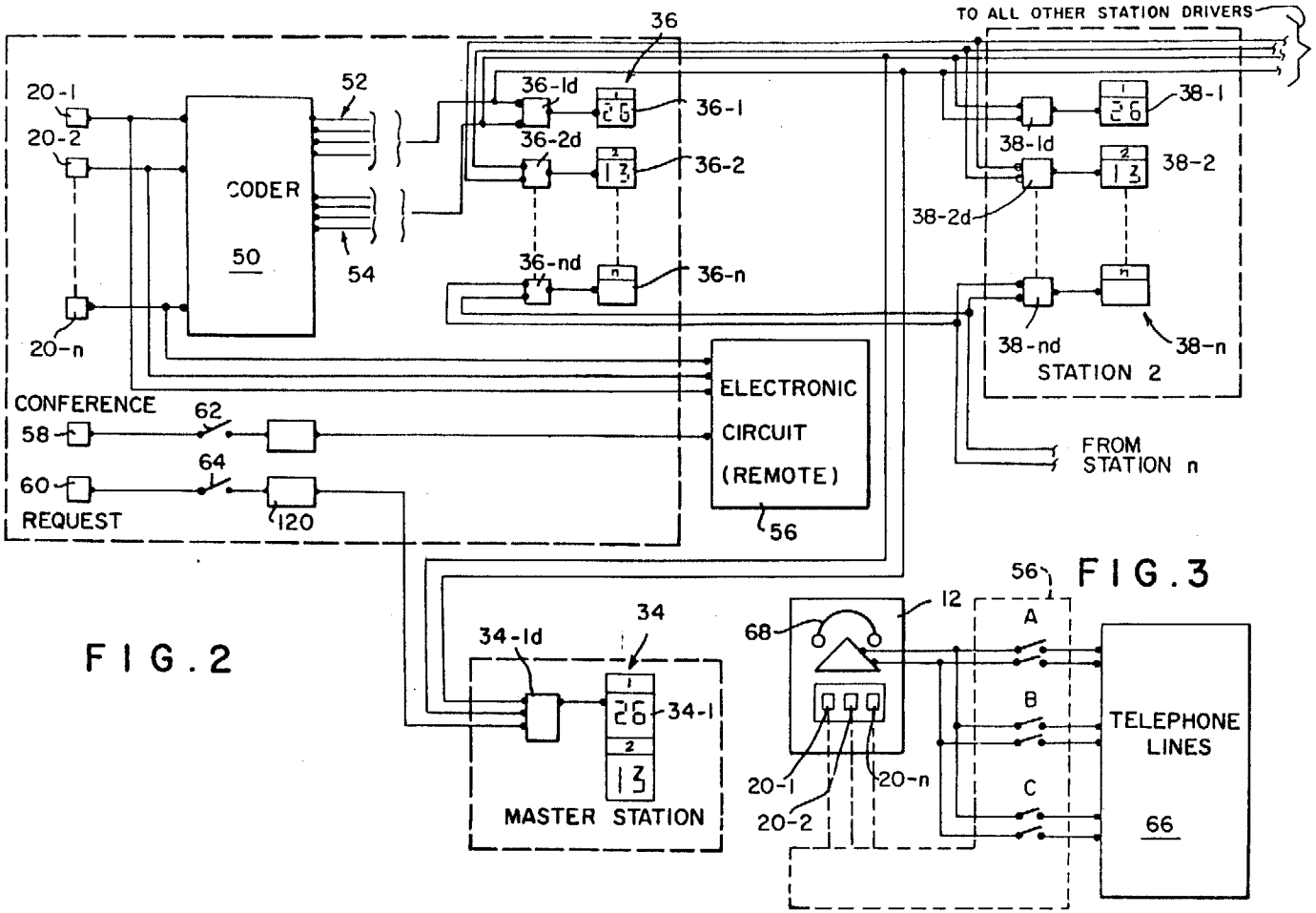
FIG. 2 is a block schematic diagram of the details of one of the stations and the details of the other of the stations relevant to said one station as representative of this invention.
FIG. 3 is a schematic diagram illustrating the interconnection of at least one of the stations through a plurality of possible lines to the conventional telephone line system.

Referring now to FIG. 2, there is shown a detail of one of the stations, station 1, with the equipment located in that station being common to all other stations. Additionally, the detail is shown for the master station which is only that which is different from the other stations with the other elements of station 1 being the same as in the master station. The same is applicable to the detail of a portion of station 2.

In station 1, a coder 50 receives as its input a line coming from a respective non-locking pushbutton switch means, designated as 20-1 through 20-n. The coder 50 is a conventional diode matrix in which each button causes a two digit output to be produced on a set of output lines 52 and 54 of coder 50. The output of coder 50 is BCD, thus, the depression of any of the non-locking pushbuttons corresponding to a telephone line will cause a unique electronic signal to be generated by the coder, the unique signal taking the form of two unique decimal numerals.

Each of the fixed panel areas 36 in each turret is comprised of an engraved location such as 36-1 corresponding to station 1 through 36-n corresponding to station n. Each of the engraved locations has the station corresponding thereto engraved thereon so that numeral 1 corresponds to station 1. Further, each of the display panels comprises a set of conventional Nixie display tubes or light emitting diodes, whichever is preferable, the electronic display producing a decimal digit corresponding to the telephone line selected. In the conventional fashion, each display corresponding to each station is driven by a conventional driver 36-1d through 36-nd, the driver producing a unique two digit signal which is decimal, in nature, for lighting the two digit display engraved location corresponding to the respective station.

As another feature of this invention, each station is capable of monitoring the active line on which each other station is communicating. Thus, when station 1 is actively communicating on telephone line 26, that same decimal number is displayed in the location corresponding to that station in each of the other stations. Thus, the unique code which causes 26 to be displayed in location 1 of station 1, is carried by wires to each of the other stations so that at station 2 numeral 26 is displayed corresponding to station 1 at location 38-1 and at the main station, numeral 26 is displayed at location 34-1 corresponding to station 1. In this manner, each of the stations can monitor the status of each of the other stations, that is, if no light is indicated at any of the other stations, that means there is no active communication, and also if there is communication, each station has the capability to determine the line with which that station is actively communicating.

As can readily be appreciated, in an environment where many people operate on similar business transactions in reasonably close proximity, the importance of one station operator knowing the status of any other station operator and the line on which each other operator is communicating can be easily seen. For instance, where commodity trading is occurring, and all the traders are located within one room, each trader must have the capability of communicating over any telephone line. Further, each trader sometimes must know which other trader is on which other line, and each trader generally has to have an idea as to which line is free, so that when the trader decides to activate a telephone line, he can easily choose one that is not presently being utilized.

As is conventionally done, when any line is selected, the non-locking pushbutton corresponding to that line is lit at all the turret or station locations, so that selection of a line by an operator can be made from among the non-lit pushbuttons.

In situations where supervisory control exists, the master station has the capability of communicating with each of the other stations in a special way, to be described later, that special way enabling the master trader to guide and properly monitor the activities of the other traders.

As illustrated, each display location has a corresponding driver, such as 36-1d in station 1, 38-1d in station 2 and 34-1d in the main station. When the specific and unique code is emitted from coder 50, it simultaneously drives all of the other drivers to simultaneously display the active line with which the station is communicating. For purposes of illustration, station 2 is shown as having numeral 13 in location 2, indicating that station 2 is actively communicating on that line and it is noted that station 1 at location 36-2 also displays numeral 13 because its driver 36-2d receives the unique code from the coder contained in station 2, as illustrated to display numeral 13.

Each station is remotely located from an electronic circuit 56, the function of which will be described later. Additionally, each station includes among other pushbuttons, a conference pushbutton 58 and a request pushbutton 60, the conference pushbutton 58 closing a corresponding switch 62, while the request pushbutton closes a corresponding switch 64. The function of the conference and request non-locking pushbuttons will be described later. It is understood that each turret or station location will have additional buttons to those already disclosed, the remainder being omitted because of their conventionality in the art. Thus, a hold button would be located at each turret, as would other similar functioning buttons that are conventionally found in the art.

Referring now to FIG. 3, there is shown a simple illustrative diagram illustrating station 1 being connected through any of a plurality of switches A, B or C to respective telephone lines 66, these lines being carried to the customer location by conventional Bell System telephone techniques. The present invention is adapted to be used with such conventional telephone lines and to enable communication to be established between any of the stations and any of the lines in accordance with the novel teachings herein. Thus, in accordance with this invention, depression of non-locking pushbutton 20-1 in FIG. 3 would cause contacts identified by A to be closed, while contacts B would be closed by depression of non-locking button 20-2 through circuit 56 to be described hereinafter. The details as to how these closing and switching functions occur will be described hereinafter.

Figure 4:
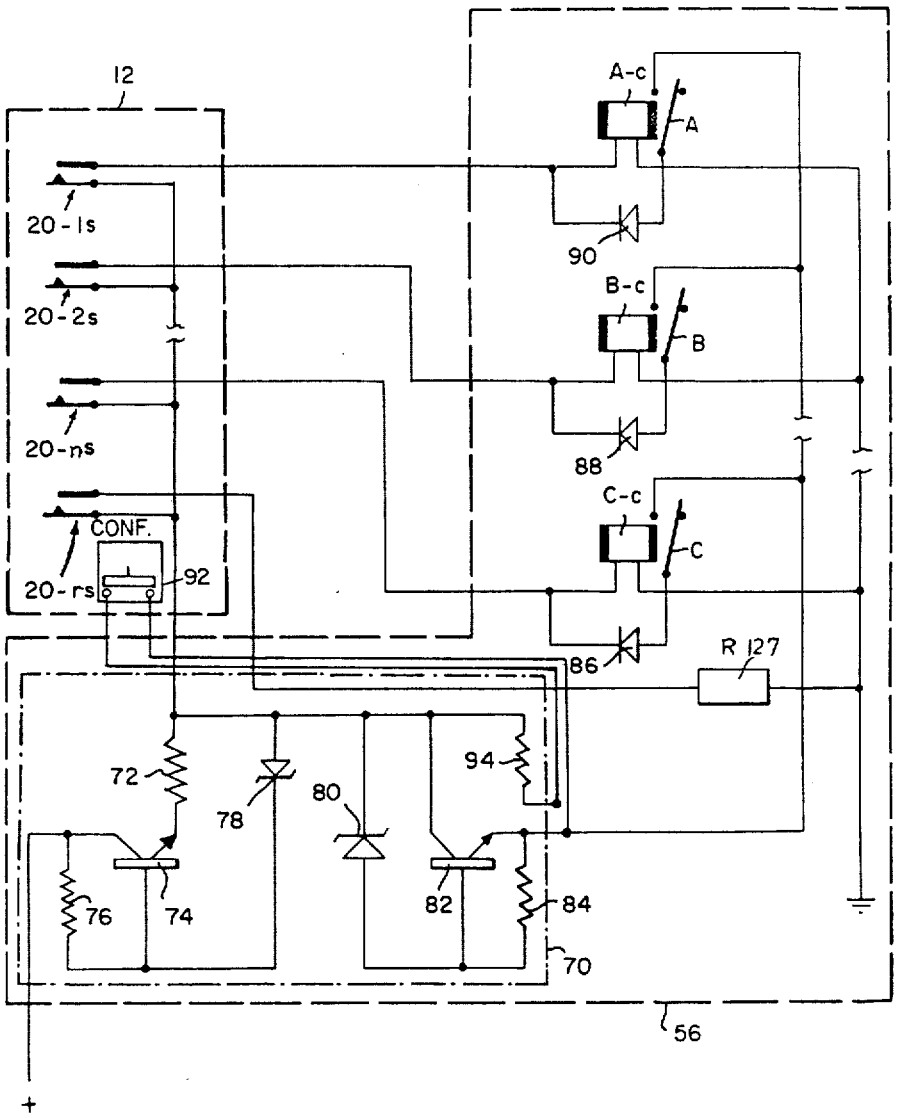
FIG. 4 is a schematic diagram of a circuit for controlling the engagement of a telephone line with a selected non-locking pushbutton.

Referring to FIG. 4, there is shown a schematic diagram of the control circuit 56, a portion of which is remotely located from the switches associated with the non-locking pushbuttons located at each station. It is noted that points A, B and C or switches A, B and C illustrated in FIG. 3 are correspondingly located and indicated in FIG. 4, it being noted that a single switch is shown in FIG. 4, whereas two such switches are shown in FIG. 3. This is because FIG. 4 is a schematic diagram, while FIG. 3 actually illustrates the two lines corresponding to each telephone line and their interconnection to each station.

It should also be noted, at this point, that at each station, there is a telephone line of the conventional type, illustrated in FIG. 3 as 68, the telephone having a conventional mouthpiece and earpiece, as is commonly found. Each station or turret may also have additional telephones associated therewith, the telephone enabling the trader or user to simultaneously have more than one instrument in his hands.

Returning now to FIG. 4, and for purposes of consistency, switches or contacts illustrated therein will be shown as corresponding to station 1 identified by numeral 12, such that non-locking pushbutton 20-1 controls switch 20-1s, non-locking pushbutton 20-2 controls switch 20-2s, non-locking pushbutton 20-ns controls switch 20-ns, and there is further shown switch or contacts 20-rs which serves to release that station from active communication with any telephone line.

A solid state control circuit 70 (remote circuit 56 of FIG. 2) is provided in which suitable control signals are developed to enable at least one set of contacts A, B or C to be closed to establish communication between a telephone line and selected station. Each of the switches or contacts A, B, and C are self-latching relays of the conventional type controlled by corresponding coils A-c, B-c and C-c which will operate in a manner to be described hereinafter. It should be noted that generally, when one pushbutton is depressed, any other previously depressed pushbutton is released, as is conventionally found in mechanical turrets. The present invention obviates much of the mechanical interconnection, and assures that depression of one of the non-locking pushbuttons will cause any prior pushbuttons to be released.

One side of each of the contacts or switches 20-1s through 20-ns is connected in common and through a resistor 72 to the emitter of an NPN-type transistor 74, the collector of which is connected to a positive source of voltage as well as through a resistor 76 to its base. The common connection of the above-mentioned switches 20-1s through 20-ns is also connected to the anode of a zener diode 78, the cathode of which is connected to the base of transistor 74. Additionally, the anode of zener diode 78 is also connected to the cathode of a zener diode 80, the anode of which is connected to the base of another NPN-type transistor 82, the collector thereof being connected to the cathode of zener diode 80. The emitter of transistor 82 is connected through a resistor 84 to its base as well as to the anodes of commonly joined diodes 86, 88 and 90, corresponding to switches or contacts C, B and A respectively. The cathodes of diodes 86, 88 and 90 are connected through respective relay coils C-c, B-c and A-c to a common ground connection.

Switch 20-rs is connected through a resistor 127 to ground and serves to release any telephone line from active communication with the station 12.

The operation of the circuit illustrated in FIG. 4 will now be explained. Assume, for purposes of illustration, that the non-locking pushbutton 20-1 is depressed and when depressed causes switch 20-1s to be closed. When that occurs, transistor 74 turns on causing a current to flow through the transistor through resistor 72 closed switch or contact 20-1s relay coil A-c to ground. When this occurs, the contact A, corresponding to relay coil A-c closes. In this condition, the voltage occurring at the anode and cathode of zener diodes 78 and 80 respectively would be the voltage supplied to transistor 74 divided by resistor 72, multiplied by the resistance of the relay coil A-c. This voltage is low. When the non-locking pushbutton 20-1s is released, the voltage at the cathode of zener diode 80 tends to rise and will continue to rise until that zener breaks down, the prior established voltage level being less than that required for breakdown. When zener diode 80 breaks down, it causes transistor 82 to be forward biased, thus establishing a current source for transistor 82, such that current flows forwardly through diode 90 through relay coil A-c to ground to keep the switch A closed in a self-latching mode. Therefore, a permanent connection is established through switch A so that telephone communication can be provided corresponding to the non-locking pushbutton 20-1s through the contact or switch A for the respective telephone line. In this manner, the telephone communications can be had between the standard telephone 68 of the station 12 and a selected one of the telephone lines 66 through contact or switch A.

Assume now that station 1 seeks to establish active communication along another telephone line. When the corresponding pushbutton, for instance, 20-2 is depressed, the relay or contact 20-2s is closed and a current path is established through transistor 74 and resistor 72 through closed contact 20-2s and relay coil B-c to ground. Since the voltage established at the cathode of zener diode 80 is lower than the breakdown voltage, the zener will become back biased and will return to its normal diode operation, thus eliminating it as a current source for transistor 82. In this mode, the current path through switch A will become open-circuited so that the relay coil corresponding thereto will also cease to carry its current so that the self-latched relay will cause contacts A to become open-circuited. Thus, upon depression of a corresponding pushbutton, all previously activated relays and coils will open-circuit, and the only active line will be the selected one. Thus, depression of a non-locking pushbutton switch means causes all prior active circuits to release, and upon release of the pushbutton, active communication is established for the switches corresponding to that pushbutton.

When switch 20-rs is depressed, the voltage at the cathode of zener diode 80 goes to ground through resistor R127 and releases any active telephone lines, since the breakdown of zener diode 80 terminates.

Referring to yet another feature of this invention, each turret is provided with a conference pushbutton, illustrated in FIG. 4 at 92. The conference pushbutton is mounted on each turret, and enables more than one line to simultaneously be connected with the established active telephone path. As noted before, when a non-locking pushbutton is depressed and released, the depression causes a breakage of all prior circuits. In the present situation, depression of a conference button prior to the depression of another or second non-locking pushbutton corresponding to a particular line will cause the self-latching relay circuit to be maintained by drawing current through the relay coil corresponding to the contact previously closed. Thus, for instance, if contact A is closed and relay coil A-c is energized, depression of the conference button prior to the depression of a second non-locking pushbutton such as 20-2s will enable current to flow through resistor 94 from transistor 74 and through switch 92 to enable the current to maintain its passage through contact A and relay A-c to ground to enable that line contact A to be maintained closed.

As seen above, the present invention eliminates the cumbersome and unwieldy mechanical interconnections commonly found in the prior art, and enables an electronic pushbutton turret control system to be provided, further in which there is illustrated the remote location of the relays, relay coils and other corresponding contacts. Thus, a relatively compact, efficient and trim turret can be provided to handle a large number of telephone lines, since electronic signals generated by the turret will activate the required switching operations at the remote electronic circuit 56.

Figure 5:
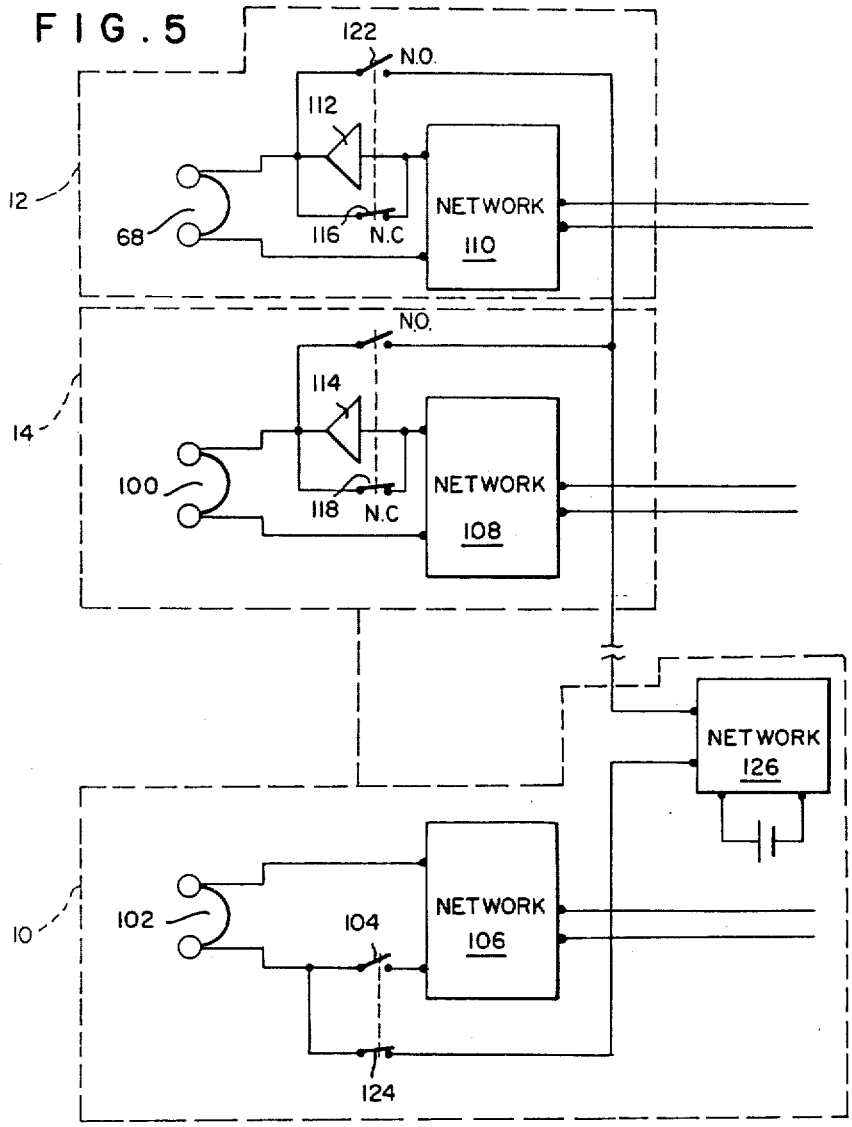
FIG. 5 is a block schematic diagram of another feature of this invention allowing one-way communication between one station and a master station with the master station overhearing the two-way communication for that station.

Referring now to FIG. 5, there is shown yet another feature of this invention which is known as ASSIST-LOOP in which the master station has the capacity to communicate with one party to a two-party conversation while overhearing the two-party conversation. As illustrated in FIG. 5, there is shown the conventional telephones 68 corresponding to station 1, 100 corresponding to station 2 and 102 corresponding to the master station, or station 10. The telephone 102 of the master station has its earpiece of the telephone connected to the conventional telephone network, commonly found in conventional telephones, and the mouthpiece is connected through a normally open contact or switch 104. Active line communication is along a corresponding telephone line connected as an input to the telephone network 106 corresponding thereto. Conventionally, when the telephone handset is lifted from its position, switch 104 will be caused to be closed to establish the desired communication. It may also be such that is desired that switch 104 be left in its open state, as will be discussed hereinafter.

Each of the other stations has the conventional network provided for telephone communication, such as at 108 and 110, corresponding to stations 2 and 1 respectively. The mouthpiece of telephone 68 is connected to telephone network 110 while the mouthpiece of telephone 100 is connected to telephone network 108 in the conventional manner. A blocking means, such as amplifiers 112 and 114, are inserted between the earpiece of each of the telephones 68 and 100 and networks 110 and 108, respectively. In normal operation, amplifiers 112 and 114 are short-circuited by the normally operated switches 116 and 118 during conventional telephone communication. When a trader at any of the stations other than the master station desires supervisory assistance, he will depress a request button (FIG. 2) indicated at 60 in station 1 which will cause a corresponding switch or set of contacts 64 to close enabling an astable multivibrator or free running oscillator 120 to generator a pulsating signal which is connected to the driver 34-1d corresponding to that station location. Operation of the request button causes the previously displayed two digit signal in location 1 at 34-1 to begin flashing in synchronism with the period of the free running oscillator.

Referring now to FIG. 5, the pushbutton 60 and switch 64 is illustratively shown as at 122 to illustrate that a request signal has been made from station 1 to the main station. The master trader, located at the master station, notices the blinking display indicating that a request has occured and then depresses his corresponding answer button 124 (FIG. 2) to establish communication through a conventional telephone network 126, such that the speaker piece of the telephone 102 is connected through network 126 through closed switch 122 to the earpiece of telephone 68. Note, that in this mode, switch 116 is open, allowing communication to normally pass in the direction indicated by the amplifier 112, but preventing communication from network 126 to pass through amplifier 112 in the reverse direction. Thus, since switches 122 and 116 are ganged together, closure of switch 122 allows the mouthpiece at the master station to be connected to the earpiece at station 1, but amplifier 112 prevents the electrical signals being carried through switch 122 to be supplied to the party communicating with the person located at stationo 1. Thus, the master trader has the ability to supervise the communication and conversation of any of his traders without the outside party being aware that such supervision is taking place, and further, the supervisor can instruct his trader as to an appropriate course of conduct without the other party to the conversation being aware thereof.

It will thus be seen that the objects set forth above, among those made apparent from the preceding description, are efficiently attained and, since certain changes may be made in the above invention without departing from the scope of the invention, it is intended that all matter contained in the above description and shown in the accompanying drawings shall be interpreted as illustrative and not in a limiting sense.

I claim:

1. For a telephone system in which telephone communication is capable of being established for each telephone station of a plurality of telephone stations over a standard telephone line by directly connecting each telephone station to a selected standard telephone line of a plurality of standard telephone lines, each of said plurality of standard telephone lines capable of being directly connected to each of said plurality of telephone stations, an improvement comprising:

a plurality of pairs of contacts, with respective pairs of said contacts being connected with respective ones of said standard telephone lines for allowing said communication;

a plurality of relay coils, with respective ones of said relay coils controlling respective pairs of said contacts to be opened or closed;

a plurality of sets of *non-locking* pushbutton [switch means] *switches* with each set of pushbutton [switch means] *switches* connected to respective ones of said telephone stations with respective ones of said pushbutton [switch means] *switches* of said sets of pushbutton [switch means] *switches* corresponding to respective ones of said standard telephone lines and being connected with a respective ones of said relay coils and being depressed for energizing a selected one of said relay coils for closing a corresponding pair of contacts to allow said telephone communication; [and]

*an electronic holding circuit for each of said relay coils, said holding circuits being operative*

*to establish a held state after initial energization of the associated relay coil by momentarily depressing the associated pushbutton switch, and*

*to maintain said corresponding pair of contacts closed while in the held state;*

*a logic circuit for each station connected to said holding circuits to detect conditions for releasing the held state;* each of said stations comprising [first light display means] *a set of status lights,* connection means connecting corresponding pushbuttons of said sets of pushbutton [switch means] *switches* in each of said stations and to said [first light display means] *status lights* for energizing said [first light display means] *status lights* in each station to display the status of each of said plurality of standard telephone lines in each of said stations, said station further comprising [first light display means] *an active line indicator separate from said status lights* connected to said pushbutton [switch means] *switches* for identifying the standard telephone line *of said plurality of standard telephone lines* that the telephone station is using for said telephone communication.

[2. A system as set forth in claim 1, wherein each of said pushbutton switch means comprises a non-locking depressible pushbutton.]

[3. A system as set forth in claim 1, further comprising coder means connected between each pushbutton switch means of each set of said pushbutton means and said second light display means at each station for generating a unique electrical signal corresponding to the selected pushbutton switch means depressed.]

4. A system as set forth in claim 1, wherein said [second light display means] *active line indicator* comprises a display area and means connected to said pushbutton [switch means] *switches* for producing a numeral on said display area indicating the standard telephone line which is in active communication.

[5. A system as set forth in claim 4, further comprising coder means connected to said pushbutton switch means for generating a unique electrical signal corresponding to the selected pushbutton switch means depressed, the output of said coder means being connected to said second light display means.]

6. A system as set forth in claim 1, comprising a turret housing a respective set of said plurality of sets of said pushbutton [means and said first and second display means] *switches and status lights, said active line indicator,* said plurality of pairs of contacts and *wherein* said plurality of relay coils [being] *is* located remotely from said turret and *further comprising* electrical cable means connecting said turret to said plurality of relay coils for carrying electrical signals to control said relay coils.

[7. A turret located at each telephone station of a plurality of telephone stations for use with a switching system, said switching system establishing telephone communication for each telephone station over a standard telephone line by directly connecting each telephone station to a selected standard telephone line of a plurality of standard telephone lines, said switching system comprising a plurality of pairs of contacts being connected with respective ones of said standard telephone lines for allowing said communication; and a plurality of relay coils, with respective ones of said relay coils controlling respective pairs of said contacts to be opened or closed;

said turret comprising a plurality of pushbutton switch means for producing an electrical control signal with respective ones of said pushbutton switch means being connected with a respective one of said relay coils for energizing a selected one of said relay coils for closing a corresponding contact pair to allow said telephone communication along said selected telephone line, panel means for mounting said plurality of pushbutton switch means, and first light display means, connection means connected between corresponding pushbutton switch means in each of said turrets and said first light display means for displaying in each turret the status of each of said plurality of standard telephone lines, said turret further comprising second light display means connected to said pushbutton switch means for identifying the standard telephone line that the telephone station is using during said telephone communication.]

[8. A turret as set forth in claim 7, wherein said turret further comprises a telephone line panel area for housing said pushbutton switch means and said first light display means, a display panel area for housing said second light display means, and a functional panel are for housing functional pushbutton switch means, all of said panel areas being formed in the same plane.]

[9. A turret as set forth in claim 7, wherein said plurality of standard telephone lines, said plurality of pairs of contacts and said plurality of relay coils are remotely located from said turret, further comprising cable means connected between said turret and said relay coils for controlling the closing of selected pairs of contacts.]

[10. In combination a plurality of telephone stations;

a plurality of standard telephone lines each being connectable to each of said plurality of telephone stations;

a plurality of pairs of contacts, with respective pairs of said contacts being connected with respective ones of said standard telephone lines for allowing telephone communication with said telephone stations;

a plurality of relay coils, with respective ones of said relay coils controlling respective pairs of said contacts to be opened or closed; and each of said stations comprising a plurality of pushbutton switch means for producing electrical control signals, with each of said pushbutton switch means being connected with a respective one of said relay coils for energizing a selected one of said relay coils for closing a selected contact pair to allow telephone communication along a selected standard telephone line of said plurality of standard telephone lines;

each of said telephone stations comprising display means connected to said pushbutton switch means in each of said telephone stations for identifying which of said other telephone stations are in active telephone communication.]

[11. A system as set forth in claim 10, wherein each of said stations comprises a turret, each of said turrets comprising a panel for said plurality of pushbuttons at said station, said panel further comprising a display panel area for said display means.]

[12. A system as set forth in claim 11, wherein said display panel area comprises a plurality of turret display areas, each of said turret display areas corresponding to a respective one of said turrets.]

[13. A system as set forth in claim 12, wherein said plurality of turret display areas comprises a plurality of windows, each of said window locations corresponding to a respective one of said turrets.]

[14. A system as set forth in claim 12, wherein each of said turret display areas comprises means for displaying the telephone line of said plurality of standard telephone lines to which each of said respective turrets is actively connected.]

[15. A system as set forth in claim 14, wherein each of said turrets comprises driver means for driving said display means, each of said driver means being controlled by a respective one of said stations to display in each station the status of all other stations, said driver means, controlling said display means to produce an alphanumeric symbol representing the telephone line of said plurality of standard telephone lines to which said respective turret is actively connected.]

[16. a system as set forth in claim 15, wherein said alphanumeric symbol comprises a two-digit decimal base number.]

[17. a system as set forth in claim 16, wherein each station comprises code means connected to respective driver means located in each of said plurality of stations, said code means driving said driver means at each of said stations to simultaneously display at all stations the telephone line of said plurality of standard telephone lines to which said respective turret is actively connected.]

[18. A system as set forth in claim 17, wherein said code means comprises a coder, said coder connected to said plurality of pushbutton switch means to produce a two-digit unique code to drive said driver means at each of said stations, said unique code representative of the specific pushbutton switch means and corresponding telephone line selected.]

[19. A system as set forth in claim 10, wherein said display means identifies the telephone line of said plurality of standard telephone lines to which each of said other stations is actively connected.]

[20. A system as set forth in claim 19, wherein each of said stations comprises a plurality of drive means connected to said pushbutton switch means for driving said display means, each of said driver means being controlled by a respective one of said stations to display in each station the status of said respective one of said stations, said drive means controlling said display means to produce an alphanumeric symbol representing the telephone line of said plurality of standard telephone lines to which each of said respective stations is actively connected.]

[21. A system as set forth in claim 20, wherein said alphanumeric symbol comprises a two-digit decimal base number.]

[22. A system as set forth in claim 21, wherein each station comprises coder means having a plurality of inputs, with each of said inputs connected to a respective one of said plurality of pushbutton switch means and output means connected to each of said plurality of stations, said coder means driving said driver means at each of said stations to simultaneously display at all stations the telephone line of said plurality of standard telephone lines to which each of said stations is actively connected.]

[23. For use with a plurality of standard telephone lines and a plurality of telephone stations;

a master telephone station;

each of said plurality of standard telephone lines connectable to each of said plurality of telephone stations and to said master telephone station;

a plurality of pairs of contacts, with respective pairs of said contacts being connected with respective ones of said standard telephone lines for allowing telephone communication with all of said telephone stations;

a plurality of relay coils, with respective ones of said relay coils controlling respective pairs of said contacts to be opened or closed;

each of said telephone stations and said master station comprising a plurality of pushbutton switch means for producing an electrical control signal with each of said pushbutton switch means being connected with a respective one of said relay coils for energizing a selected one of said relay coils for closing a selected contact pair to allow telephone communication along a selected telephone line of said standard telephone lines;

said master station comprising a plurality of display means with respective ones of said plurality of said display means connected to respective ones of said telephone stations for identifying which of said telephone stations are in active telephone communication; and signaling means connected to each of said telephone stations for providing a request signal displayed on respective display means at said master telephone station.]

[24. For a telephone system in which telephone communication is capable of being established for each telephone station of a plurality of telephone stations over a standard telephone line by directly connecting each telephone station to a selected standard telephone line of a plurality of standard telephone lines, an improvement comprising each of said telephone stations comprising a network being capable of establishing two-way telephone communication through said network over said standard telephone line;

a master telephone station; said master station comprising an additional network connectable to each of said plurality of telephone stations enabling said master station to have two-way communication with any of said plurality of telephone stations, said master station being connected to hear the communication at any of said telephone stations;

each of said telephone stations comprising blocking means to block the communication received from said master station from being transmitted to said standard telephone line.]

[25. The system of claim 24, wherein each of said plurality of telephone stations comprises a transmitter and a receiver, said blocking means being connected to said receiver, and shunt means connected across said receiver, said shunt means normally being operative permitting standard two-way telephone communication through said network at said telephone station over said standard telephone lines.]

[26. The system of claim 24, wherein each of said telephone stations comprise a request switch being closed to connect said additional network to a respective telephone station, said master station comprising an answer switch being closed to connect said master station to said additional network.]

[27. In combination a plurality of telephone stations;

a plurality of standard telephone lines being connectable to each of said plurality of telephone stations;

switching means for selectively directly connecting each telephone station to any one of said plurality of telephone lines to permit said communication;

each telephone station comprising a respective plurality of pushbutton switch means connected to said switching means, each of said respective pushbutton means operating said switching means to connect a corresponding selected telephone line to the corresponding telephone station for active communication; and each of said stations comprising display means connected to said pushbutton switch means in each of said telephone stations for identifying which of the other stations are in active telephone communication.]

[28. A system as set forth in claim 22, wherein each of said stations comprises a turret comprising said respective plurality of pushbutton switch means, each of said turrets comprising panel means including a panel for said respective plurality of pushbuttons, said panel means further comprising a display panel area for said display means.]

[29. A system as set forth in claim 28, wherein said display panel area comprises a plurality of turret display areas, each of said turret display areas corresponding to a respective one of said turrets.]

[30. A system as set forth in claim 29, wherein said plurality of turret display areas comprises a plurality of windows, each of said window locations corresponding to a respective one of said turrets.]

[31. A system as set forth in claim 29, wherein each of said turret display areas comprises means for displaying the telephone line of said plurality of standard telephone lines to which each of said respective turrets is actively connected.]

[32. A system as set forth in claim 31, wherein each of said stations comprises driver means for driving said display means, each of said driver means being controlled by a respective one of said stations to display in each station the status of said respective one of said stations, said driver means controlling said display means to produce an alphanumeric symbol representing the telephone line of said plurality of standard telephone lines to which said respective station is actively connected.]

[33. A system as set forth in claim 32, wherein said alphanumeric symbol comprises a two-digit decimal base number.]

[34. A system as set forth in claim 33, wherein each station comprises code means connected to respective drivers in each of said plurality of stations, said code means driving said driver means at each of said stations to simultaneously display at all stations the telephone line of said plurality of standard telephone lines to which said respective turret is actively connected.]

[35. A system as set forth in claim 34, wherein said code means comprises a coder, said coder connected to said plurality of pushbutton switch means to produce a two-digit unique code to drive said driver means at each of said stations, said unique code representative of the specific pushbutton switch means and corresponding standard telephone line selected.]

[36. A system as set forth in claim 27, wherein said display means identifies the telephone line of said plurality of standard telephone lines to which each of said respective stations is actively connected.]

[37. A system as set forth in claim 36, wherein each of said stations comprises driver means connected to said pushbutton switch means for driving said display means, each of said driver means being controlled by a respective one of said stations to display in each station the status of said respective one of said stations, said driver means controlling said display means to produce an alphanumeric symbol representing the telephone line of said plurality of standard telephone lines to which said stations are actively connected.]

[38. A system as set forth in claim 37, wherein said alphanumeric symbol comprises a two-digit decimal base number.]

[39. A system as set forth in claim 38, wherein each station comprises coder means having a plurality of inputs with each of said plurality of inputs connected to a respective one of said plurality of respective pushbutton switch means and output means connected to each of said plurality of stations, said coder means driving said driver means at each of said stations to simultaneously display at all stations the telephone line of said plurality of standard telephone lines to which said station is actively connected.]

[40. A system as set forth in claim 27, wherein said display means comprises light generation means for identifying which of said telephone stations is in active communication.]

[41. For use with a plurality of standard telephone lines, a plurality of telephone stations;

a master telephone station;

each of said plurality of standard telephone lines connectable to each of said plurality of stations and to said master telephone station;

switching means for selectively directly connecting each telephone station to any of said plurality of telephone lines to permit said communications;

each of said stations and said master station comprising a respective plurality of pushbutton switch means connected to said switching means, each of said respective pushbutton means operating said switching means to connect a corresponding selected telephone line to the corresponding telephone station for active communication;

said master station comprising display means connected to said pushbutton switch means in each of said stations for identifying which of said other stations is actively connected to any of said standard telephone lines; and signaling means connected to each of said stations for providing a request signal displayed at said master station.]

[42. A system as set forth in claim 41, wherein said display means of said master station comprises separate display areas corresponding to each of said stations, said request signal being displayed in said display area corresponding to said station providing said request.]

[43. A system as set forth in claim 42, wherein said display means comprises means to display a representative code corresponding to the active telephone line to which each of said stations is actively connected, said station providing said request producing a signal to periodically turn the displayed code on and off for signaling the request.]

[44. A system as set forth in claim 43, wherein said master station comprises means for establishing a connection between said master station and the station providing the request signal.]

[45. A system as set forth in claim 44, wherein the operator as said station providing the request signal is in telephone two-way communication over a standard telephone line with another operator at another telephone location, said master station comprising means connected to said station providing the request signal to establish connection to said two-way communication, said station providing the request signal comprising switching means for enabling said master station to communicate directly with said station providing the request signal and blocking means to prevent the operator at said other location from hearing the communication between said master station and said station providing the request signal.]

46. A turret located at each telephone station of a plurality of telephone stations for use with a switching system, said switching system establishing telephone communication for a telephone station over each standard telephone line by directly connecting each telephone station to a selected standard telephone line of a plurality of standard telephone lines, said switching system comprising *a holding circuit for each standard telephone line of said plurality of standard telephone lines to establish a held state after momentary actuation,* switching means for selectively directly connecting each telephone station to any one of said plurality of standard telephone lines *according to said held state* to permit said communication; *and* a logic circuit for each *station connected to said holding circuits to detect conditions for releasing said held state;* said turret comprising a plurality of non-locking pushbutton [switch means] *switches* connected to said switching [means] *system,* each of said non-locking pushbutton [means] *switches being connected to momentarily actuate one of said holding circuits when depressed for* operating said switching means to connect a corresponding selected standard telephone line to the telephone station corresponding to said turret for active communication;

panel means for mounting said plurality of pushbutton [switch means] *switches,*

[first light display means] *status indicator lights,* connection means connected between corresponding pushbutton [switch means] *switches* in each of said turrets and said [first light display means] *status lights* for displaying the status of each of said plurality of standard telephone lines, [said turret further comprising second light display means] *an active line indicator* connected to said non-locking pushbutton [switch means] *switches* for identifying the standard telephone line *of said plurality of standard telephone lines* that the telephone station is using during said telephone communication.

47. A turret as set forth in claim 46, wherein said plurality of standard telephone lines[, said plurality of pairs of contacts] and said switching [means] *system* are remotely located from said turret[, further comprising cable means connected between said turret and said switching means].

[48. For a telephone system in which telephone communication is established for each telephone station of a pluraity of telephone stations over a standard telephone line by directly connecting each telephone station to a selected standard telephone line of a plurality of standard telephone lines, each of said plurality of standard telephone lines capable of being directly connected to each of said plurality of telephone stations, an improvement comprising switching means for selectively directly connecting said one telephone station to any one of said plurality of standard telephone lines to permit said communication;

each of said telephone stations comprising a plurality of pushbutton switch means connected to said switching means, each of said pushbutton means operating said switching means to connect a corresponding selected telephone line to said one station for active communication;

said plurality of standard telephone lines and said switching means being remotely located from said plurality of stations;

each of said telephone stations comprising display means connected to said pushbutton switch means in all of said telephone stations for identifying which of said separate telephone lines is connected with which of said stations for active communication; and electrical cable means connected between each of said stations and said switching means.]

49. For a telephone system in which each telephone station of a plurality of telephone stations can communicate over a standard telephone line by directly connecting each telephone station to a selected standard telephone line of a plurality of standard telephone lines, each of said plurality of standard telephone lines capable of being directly connected to each of said plurality of telephone stations, an improvement comprising, switching means for selectively directly connecting each telephone station to any one of said plurality of telephone lines to permit said communication;

each of said stations comprising a plurality of nonlocking *momentary contact* pushbutton [switch means] *switches* connected to said switching means to connect a corresponding selected telephone line to each of said stations, for active communication;

*said switching means including a holding circuit for each standard telephone line of said plurality of standard telephone lines, said holding circuits being coupled to said pushbutton switches,*

*being operative to establish a held state after momentary actuation of a pushbutton switch to indicate which pushbutton at which station was actuated, and*

*being operative to connect a selected station to a selected one of said standard telephone lines according to said held state;* each of said stations comprising [first light display means] *status indicator lights,* connection means for connecting corresponding ones of said push button switch means in each of said stations to said [first light display means] *status indicator lights* for displaying the status of each of said plurality of standard telephone lines [and second light display means] *an active line indicator for each of said stations separate from said status lights and* connected to said nonlocking [pushbuttons] *pushbutton switches and said holding circuits* for identifying which telephone line *of the plurality of lines* the station is using for active telephone communication *according to a held state of said holding circuits; and*

*a logic circuit for each station connected to said holding circuits to detect conditions releasing the held state.*

*50. The combination according to claim 1, 46 or 49 further including a conference pushbutton and line release pushbutton and wherein said logic circuit releases any holding circuit having a held state associated with a particular station*

*whenever another pushbutton at said associated station is momentarily depressed unless done in combination with actuation of said conference pushbutton or*

*whenever said release pushbutton at said associated station is actuated.*

*51. The combination according to claim 46 or 49 further including active line indicators at each station for each other station in the system, and wherein said active line indicators at each station indicate the active line to which each telephone in the system is connected.*

*52. The combination according to claim 51 wherein said active line indicators are illuminated numeric indicators.*

* * * * *

UNITED STATES PATENT AND TRADEMARK OFFICE

CERTIFICATE OF CORRECTION

PATENT NO. : Re 31,144

DATED : February 8, 1983

INVENTOR(S) : Thomas E. Feil

It is certified that error appears in the above-identified patent and that said Letters Patent is hereby corrected as shown below:

Claim 1, line 24, delete "a".

Claim 6, line 4, delete the comma (",") and after "lights" insert --and--.

Claim 6, line 5, delete "wherein" and insert --and wherein-- preceding "said plurality".

Claim 6, line 6, change "is" to --are--.

Claim 6, line 7, insert a comma (--,--) after "turret".

Signed and Sealed this

First Day of December, 1987

*Attest:*

DONALD J. QUIGG

*Attesting Officer*

*Commissioner of Patents and Trademarks*